United States Patent [19]
Carlisle

[11] 4,454,760
[45] Jun. 19, 1984

[54] PRESSURE SENSING SYSTEM
[75] Inventor: George W. Carlisle, Ann Arbor, Mich.
[73] Assignee: King Engineering Corporation, Ann Arbor, Mich.
[21] Appl. No.: 287,351
[22] Filed: Jul. 29, 1981
[51] Int. Cl.³ .................... F16K 37/00; G01F 23/16
[52] U.S. Cl. ...................... 73/302; 73/299; 73/751; 137/100; 137/403
[58] Field of Search ........... 73/302, 701, 716, 715, 73/706; 251/24; 137/219, 403, 100

[56] References Cited
U.S. PATENT DOCUMENTS

| | | | |
|---|---|---|---|
| 1,631,909 | 6/1927 | Badin | 137/403 X |
| 2,265,114 | 12/1941 | Hartley | 137/153 |
| 2,509,078 | 5/1950 | Stover | 137/502 X |
| 2,749,744 | 6/1956 | Doudera, Jr. et al. | 73/52 |
| 2,890,714 | 6/1959 | Greenwood et al. | 137/484.2 |
| 2,953,917 | 9/1960 | Kirk | 73/375 |
| 3,071,402 | 1/1963 | Lasto et al. | 294/64 |
| 3,161,051 | 12/1964 | Perry, Jr. | 73/299 |
| 3,163,145 | 12/1964 | Duhaime et al. | 228/29 |
| 3,172,420 | 3/1965 | Brown et al. | 137/219 |
| 3,323,369 | 6/1967 | Kallenbach | 73/299 X |
| 3,411,529 | 11/1968 | Bassett | 137/403 |
| 3,433,249 | 3/1969 | Nelson | 137/403 X |
| 3,474,953 | 10/1969 | Duhaime et al. | 73/299 X |
| 3,545,465 | 12/1970 | Zadoo | 137/484.8 |
| 3,561,662 | 2/1971 | Duhaime et al. | 73/299 |
| 3,590,850 | 2/1971 | Grise | 251/24 X |
| 3,667,494 | 6/1972 | Haase | 73/861.63 |
| 3,760,638 | 9/1973 | Lawson et al. | 73/706 |
| 3,803,917 | 4/1974 | Reese et al. | 73/300 X |
| 4,158,528 | 6/1979 | Lasto et al. | 417/163 |
| 4,193,307 | 3/1980 | Baker et al. | 73/701 |

FOREIGN PATENT DOCUMENTS

| | | | |
|---|---|---|---|
| 691139 | 7/1964 | Canada | 73/299 |
| 947010 | 1/1964 | United Kingdom | 73/299 |

OTHER PUBLICATIONS

Publ.–"Safegard" Liquid Measurement Systems Brochure, King Engineering Co., 2 pages, No. 1300, 1–100 (1978).
Publ.–"Acra–Sensor Systems" Group SB & SE Liquid Measurement Systems Brochure 10005, King Engineering Co., 2 pages (1978).
Publ.–"Acrasensor" Measurement Systems Brochure, King Engineering Co., 2 pages (1978), 1100–25N.
"Liqui-Seal II–Operation Sequence" EX–1448–Effective Jan. 1976, 1 page, King Engineering Corporation.
"Liquid Measurement Systems"–General Sales Brochure 1100–10N, Diaphragm Sensor, 4 pages, ©1978, King Eng. Corp.
"Liquid Measurement Systems"–Systems Brochure 1100–20N–TeleSensor, 2 pages, ©1978, King Eng. Corp.
"Liquid Measurement Systems"–Systems Brochure 1100–25N–AcraSensor, 4 pages ©1978, King Eng. Corp.
Liquid Measurement Systems–Technical Brochure 1300–1–760–"Sensor Control", 1 page, ©1978, King Eng. Corp.
Liquid Measurement Systems–Technical Brochure 1300–1–761–"RatioMatic Sensor Control", 2 pages, ©1978, King Eng. Corp.
Liquid Measurement Systems–Technical Brochure 1300–1–762, "DynaGard Sensor Control", 2 pages, ©1978, King Eng. Corp.
Liquid Measurement Systems–Technical Brochure 1300–1–763, "Safety Sensor Control", 2 pages, ©1978, King Eng. Corp.
Liquid Measurement Systems–Technical Brochure 1300–1–764, "RatioMatic Safety Sensor Control", 2 pages, ©1978, King Eng. Corp.
Liquid Measurement Systems–Technical Brochure 1300–1–765, "DynaGard Safety Sensor Control", 2 pages, ©1978, King Eng. Corp.
Liquid Measurement Systems–Technical Brochure 1300–1–735, LiquiSeal Purge Control, 2 pages, ©1978, King Eng. Corp.
Liquid Measurement Systems–Technical Brochure 1300–1–736, RatioMatic LiquiSeal Purge Control, ©1978, 2 pages, King Eng. Corp.
Liquid Measurement Systems–Technical Brochure 1300–1–737, "DynaGard LiquiSeal Purge Control", 2 pages, ©1978, King. Eng. Corp.

Liquid Measurement Systems–Technical Brochure 1300-1-780, "Purge Control", ©1978, 1 page.
Liquid Measurement Systems–Technical Brochure 1300-1-781, "RatioMatic Purge Control", 2 pages, ©1978, King Eng. Corp.
Liquid Measurement Systems–Technical Brochure 1300-1-782, "DynaGard Purge Control", ©1978, 2 pages.
Liquid Measurement Systems–Technical Brochure 1300-1-720, "RatioMatic Relay", ©1978, 1 page.
Liquid Measurement Systems–Technical Brochure 1300-1-786, "Area Purge Control", ©1978, 2 pages.
Liquid Measurement Systems–Catalog 1000, ©1978, 8 pages.
Liquid Measurement Brochure In the Dairy and Other Food Industries with the Sanitary King–Gage Sensometer System–Catalog 1020-C, ©1971, 12 pages.

*Primary Examiner*—Daniel M. Yasich
*Attorney, Agent, or Firm*—Harness, Dickey & Pierce

[57] ABSTRACT

An apparatus for measuring fluid pressures which comprises a gas-type pressure sensor and a sensor control for supplying controlled purge gas to the sensor and for receiving vent gas from the sensor. The apparatus further includes a unique pressure-reducing device operable in response to a differential gas pressure in the sensor control for creating a zone of pressure less than any other in the apparatus, which zone is placed in fluid communication with gas in the apparatus to reduce the overall pressure thereof. This permits the accurate measuring of pressure at or below atmospheric. An integral design and a retrofit design are disclosed.

23 Claims, 8 Drawing Figures

FIG. 3.

PRESSURE SENSING SYSTEM

BACKGROUND AND SUMMARY OF THE INVENTION

The present invention relates to pneumatic systems for accurately measuring and indicating fluid pressure, and to more particularly such systems for remotely measuring the weight, volume or depth of liquids in large processing or storage tanks. Cross-reference is made to the later-filed copending application, Ser. No. 359,581, filed Mar. 18, 1982, and assigned to the same assignee as the applicant's assignee herein.

The type of system over which this invention is an improvement is illustrated in U.S. Pat. No. 3,161,051 issued Dec. 15, 1964 (the disclosure of which is incorporated herein by reference). It generally comprises a flush diaphragm-type sensing unit or transmitter mounted in the tank wall (near the bottom of the tank), one side of the diaphragm being in contact with the liquid being measured. The other side ("indicator") side of the diaphragm is supplied a substantially constant volume of air (or other inert gas) which is vented through a nozzle to an extent proportionate to the position of the diaphragm. The result is that the pressure on the indicator side of the diaphragm is maintained substantially equal to the pressure on the liquid side of the diaphragm and the vent passage is constantly and dynamically proportional to the amount of such pressure (and hence the weight, volume or depth of the liquid in the tank).

One of the problems encountered with systems of this type is that they will not operate on tanks which are under a vacuum (such as in many "septic" processes in the food and pharmaceutical fields), and that they are inherently not very accurate when the pressure in the tank is very close to the vent or ambient pressure (such as when the tank is completely or almost empty). This problem is aggravated in systems using stainless steel diaphragms because for some reason it has been discovered that stainless steel diaphragms introduce significantly greater errors into the pressure readings at close to vent pressure than do conventional elastomeric diaphragms. This means that accuracy has to be sacrificed in applications requiring tough, cleanable stainless steel diaphragms.

It is therefore the primary object of the present invention to provide an improved system of the aforesaid type which has all the advantages of existing systems and yet overcomes the aforesaid problems. A related object resides in the provision of such a system which is very simple in construction, which does not materially increase operating costs, and which is readily adapted to be easily retrofit into existing systems with a minimum of difficulty.

These and other objects, features and advantages of the present invention will become apparent from the subsequent description and the appended claims, taken in conjunction with the accompanying drawings.

DETAILED DESCRIPTION OF THE PREFERRED EMBODIMENT

Figure 1:
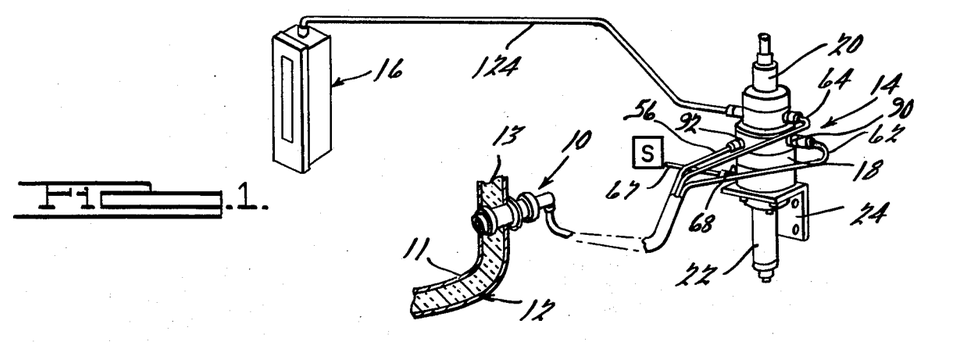
FIG. 1 is a pictorial view of a pneumatic measuring and indicating system embodying the principles of the present invention.
Figure 3:
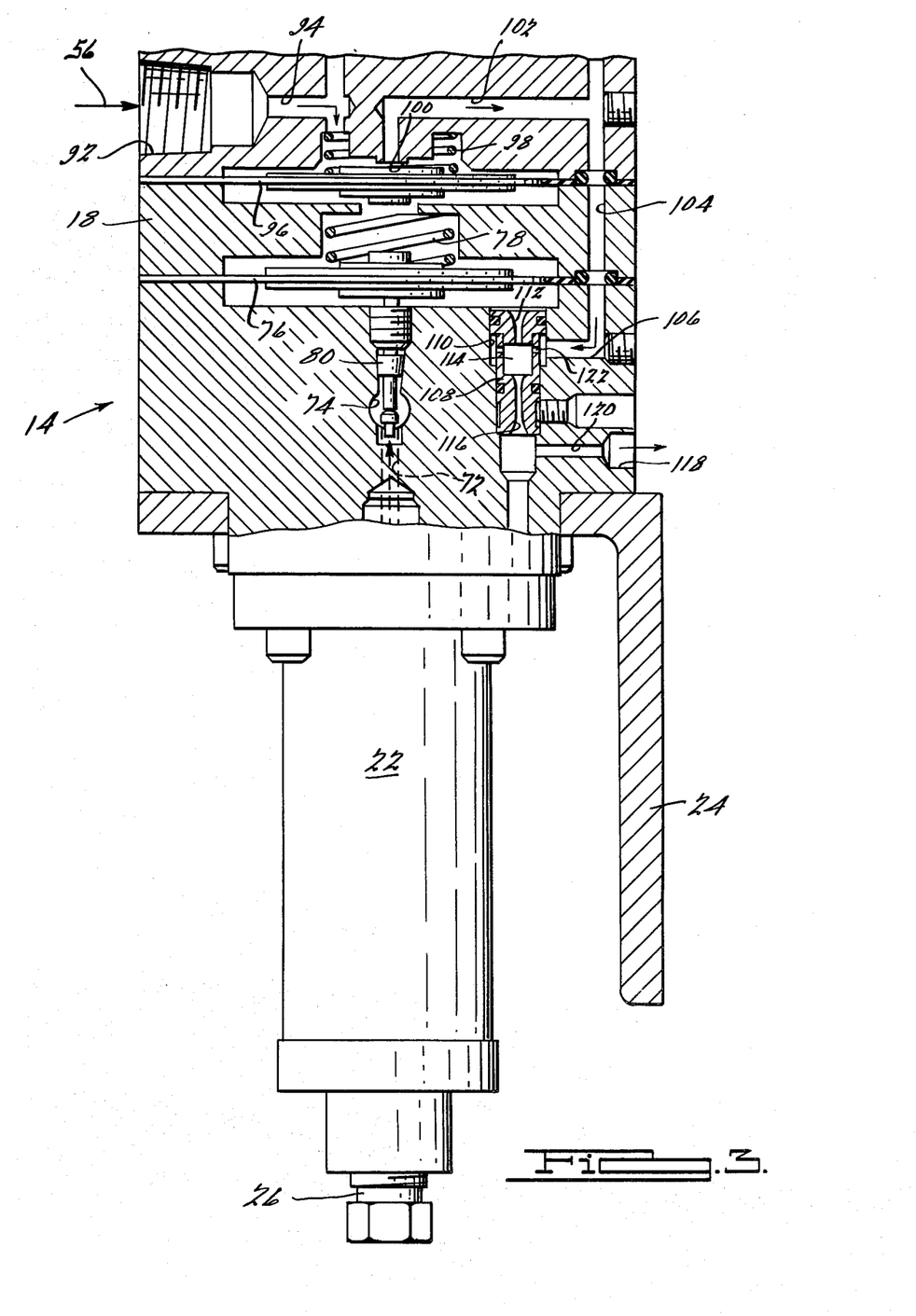
FIG. 3 is a fragmentary vertical section through the sensor control of the system illustrated in FIG. 2 but taken at right angles thereto.

Although the present invention is applicable to any pressure measuring system, it is disclosed herein embodied in a liquid level measuring system. The system generally comprises a sensor 10 sealingly disposed in the wall 11 of a liquid vessel or tank 12 and in pneumatic communication with a sensor control 14, which in turn is connected to a liquid level indicator or gage 16. The outside of the tank may, if desired, be covered with insulation 13. Sensor control 14 comprises several sections bolted together, including a main body 18, an optional over-pressure valve 20, optional filter 22 and a mounting bracket 24. Filter 22 may be provided with a conventional automatic drain 26 (FIG. 3). Except for the use, fluid flow location and structure of the vacuum producing means, sensor control 14 is old. Also, none of the details of construction of sensor 10 form a part of this invention. Therefore, only so much of the construction as is necessary to understand the present invention is shown and described.

Figures 4, 5, 6:
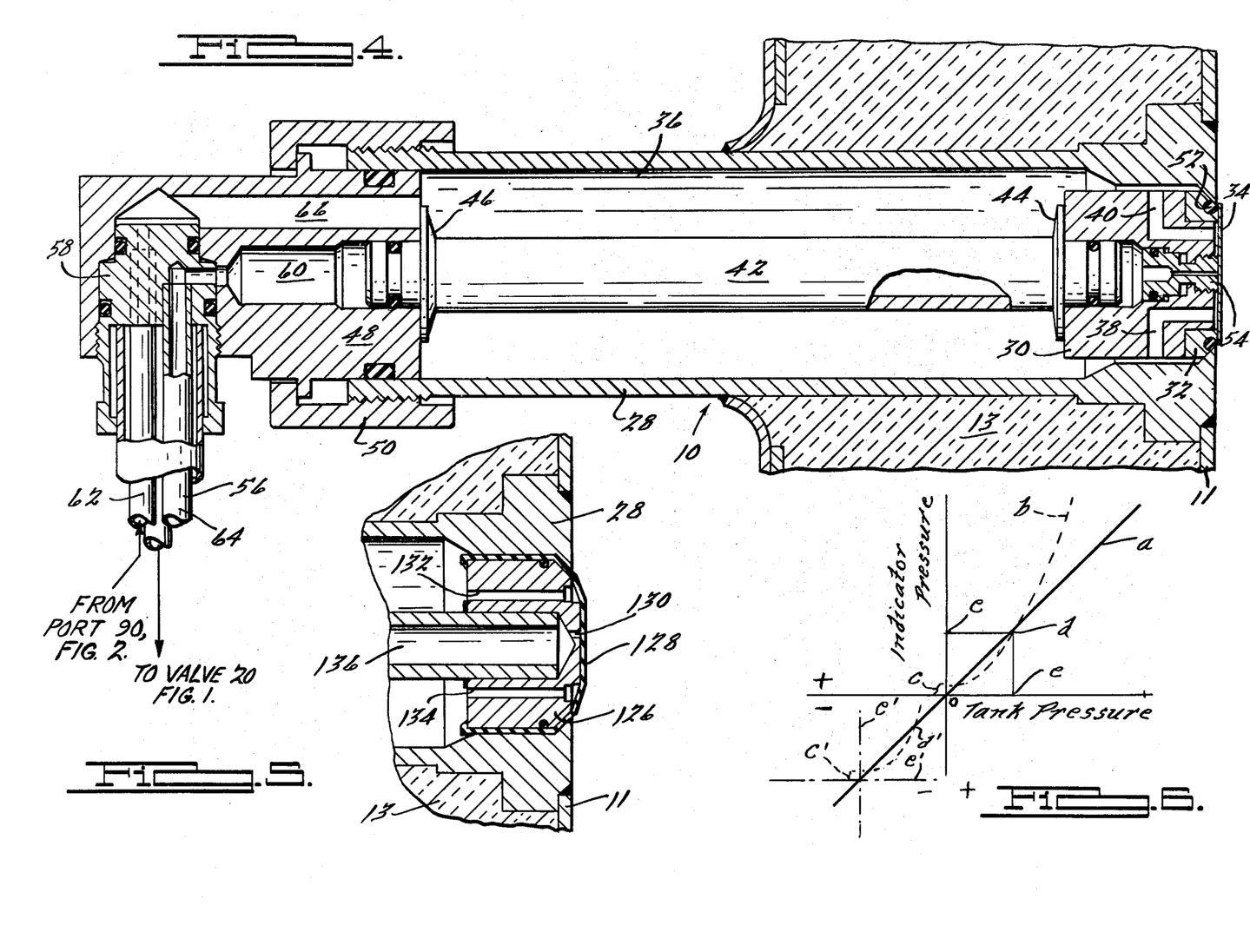
FIG. 4 is a longitudinal sectional view through the sensor of the system illustrated in FIG. 1.
FIG. 5 is a fragmentary sectional view of the portion of the sensor of FIG. 4 showing a modified version thereof.
FIG. 6 is a graph showing in exaggerated form the relationship of indicator pressure to tank pressure.

As best shown in FIG. 4, sensor 10 comprises a shell 28 welded at its inner end to the wall 11 of the tank and having disposed therein a transmitter assembly including a body 30 having affixed to the inner end thereof a ring 32 having a stainless steel diaphragm 34 sealingly affixed to the end surface thereof. There is a very small clearance space between the outside or indicator side of the diaphragm and the inner end of body 30 which is placed in fluid communication with the interior 36 of shell 28 by means of passages 38 and 40, and a clearance between the shell and body 30. The transmitter assembly is held in the position shown by means of a hollow post 42 which has shoulder-retained washers 44 and 46 bearing on body 30 and a connector 48, respectively. The parts are urged to the right as shown in FIG. 4 by means of a nut 50 which threadably engages shell 28. The parts are configured to provide a substantially flush surface on the inside of the tank (i.e., the liquid side of the diaphragm) and an O-ring 52 provides a seal between the transmitter assembly and shell 28. Body 30 has a central bore in which is threadably disposed a nozzle 54 having an inner face in very close proximity to the indicator side of diaphragm 34. The passageway through the nozzle is in sealed fluid communication with the interior of post 42, which in turn communicates with a flexible tube 56 via a central passage 60 in connector 48 and a fitting 58 sealingly disposed within connector 48. Fitting 58 also contains flexible tubes 62 and 64 which communicate with a passage 66 in connector 48 (shown in part) which in turn communicates with interior 36 of shell 28 and ultimately the clearance space between diaphragm 34 and the transmitter assembly.

The present invention is also fully applicable to sensors utilizing elastomeric diaphragms, such as the exemplary construction illustrated in FIG. 5, wherein there is shown an alternative transmitter construction. The remaining parts of the sensor are identical to those disclosed in the first embodiment and identical reference numerals are used to identify like parts. The transmitter of this embodiment comprises a body 126 over the outer surface of which is stretched a diaphragm 128 formed of suitable elastomeric material. Body 126 has a nozzle opening 130 corresponding to nozzle 54 of the first embodiment and passageways 132 and 134 corresponding to passageways 38 and 40 in the first embodiment. Rigidly affixed to body 126 is a hollow post 136 which corresponds to post 42 in the first embodiment. The remaining structure is the same.

Figure 2:
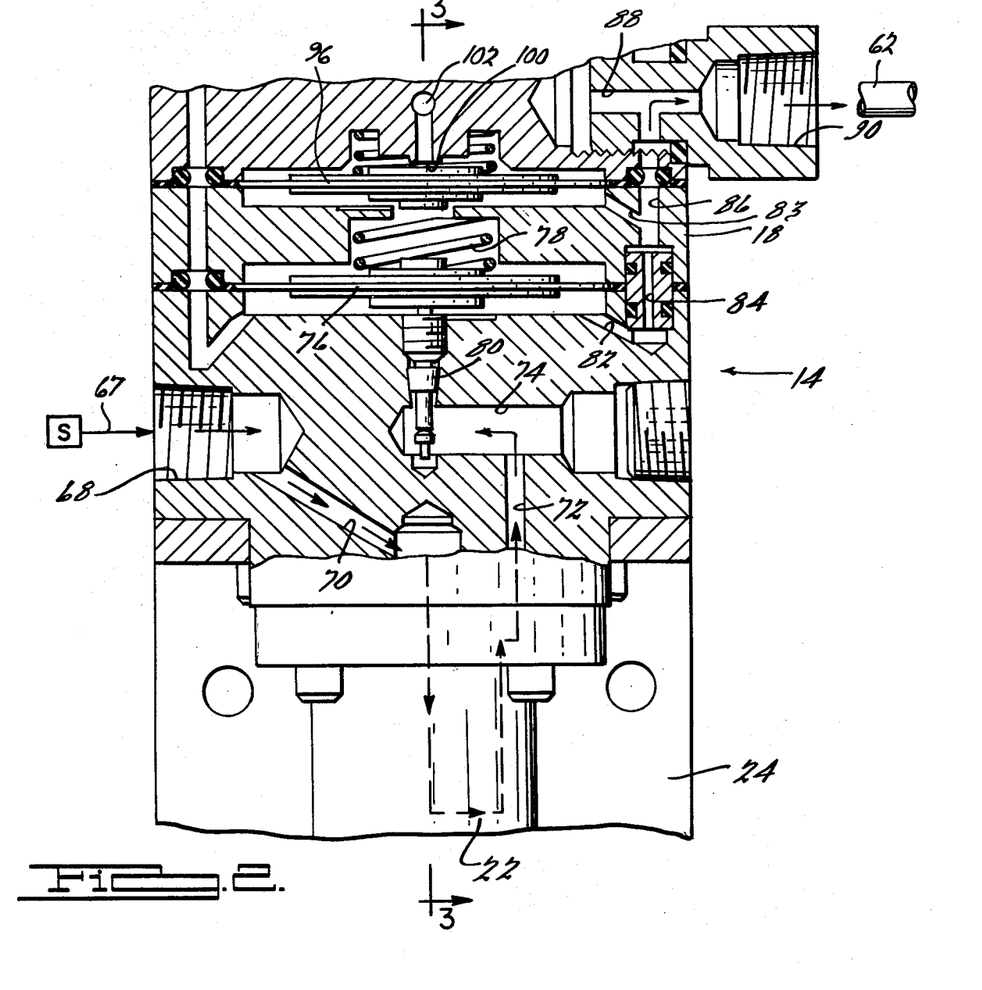
FIG. 2 is a fragmentary vertical section through the sensor control of the system illustrated in FIG. 1.

The portion of sensor control 14 which is most important to an understanding of the present invention is the portion disposed within body 18, the basic structure of which is best illustrated in FIGS. 2 and 3. A supply of air under pressure, designated by reference character S, is communicated to the control 14 via a flexible line 67 (shown schematically in FIG. 2) connected to a supply port 68, from which the air is communicated via a passage 70 through a conventional filter 22, as is also shown schematically in FIG. 2, which removes undesired liquid particles and particulate matter. The filtered air then passes from filter 22 through passages 72 and 74 to a first pressure regulator means comprising a diaphragm 76, a compression spring 78 and a Schroder-type valve 80 which opens on downward movement of the diaphragm. This regulator means is fully equivalent to regulator 44 in the aforesaid '051 patent; it functions to maintain (via passages 82 and 83) a substantially constant pressure differential across a flow control orifice 84. The filtered supply air thus passes through valve 80, passage 82 and orifice 84, which causes it to be delivered into a passage 86 at substantially constant volume (cfm). From passage 86 it flows via a passage 88 to a port 90 to which the other end of flexible tube 62 is connected. This regulated volume (cfm) of air is the purge air supplied to the indicator side of the diaphragm in the sensor 10, as described above.

This regulated air activates the sensor by opposing the liquid pressure on the liquid (or tank) side of the diaphragm. When these pressures reach equality excess air is vented from the sensor via nozzle 54 shown in FIG. 4 and flexible tubing or vent line 56 to a vent port 92 in the sensor control 14, as shown schematically in FIG. 3. From this vent port 92 the vent air passes through a passage 94 to a second pressure regulator means comprising a diaphragm 96, a compression spring 98 and a valve 100 which is urged open by spring 98. The second regulator means is fully equivalent to the "back pressure" regulator 72 in the aforesaid '051 patent. It maintains a substantially constant pressure differential between the purge air and the vent air, and thereby improves system accuracy by eliminating the effects of distortion of the diaphragm at different pressures.

In prior systems air from this second regulator means was vented directly to atmosphere. In accordance with the present invention, however, this does not occur. Instead, the vent air is communicated via passages 102, 104 and 106 to an eductor 108 disposed within a bore 110 in the flow control. Eductor 108, which is conventional per se, comprises a converging inlet nozzle 112 in communication with the relatively high pressure (with respect to atmospheric) air in the cavity of diaphragm 76 immediately upstream of orifice 84, a chamber 114 and a converging/diverging outlet nozzle 116 communicating with an outlet vent port 118 via a reduced diameter passage 120 which provides sound attenuation. Chamber 114 is in fluid communication with passage 106 via a plurality of openings 122. Air flowing through eductor 108 from the first regulator to atmospheric vent port 118 creates (in accordance with known principles) a vacuum in chamber 114. This causes the system vent pressure to drop substantially below atmospheric pressure, which thereby makes it possible to measure negative gage pressures, or liquids in vacuum tanks.

In the present system pressures are indicated by a gage or indicator, such as the manometer 16 in FIG. 1, connected by a flexible tube 124 to the over-pressure valve 20 which in turn is connected by flexible tube 64 to sensor 10, and thus also to tube 62 through fitting 58 as discussed above and shown in FIG. 4. The pressure of the purge air in sensor 10 is proportional to the weight, volume and/or depth of the liquid fluid or in the tank and it is air at this pressure which is communicated to gage 16. Valve 20 (details not shown) is normally open to permit the free flow of air from indicator tube 64 to tube 124, and closes only in the presence of excessive pressures which would damage the indicator 16.

The manner in which the system functions may be easily understood by referring to FIG. 6, which illustrates the relationship between tank pressure and gage pressure. If it is assumed that the system is designed to provide a one-to-one ratio between these pressures the relationship would be theoretically represented by a straight line a extending at 45° and passing through zero gage pressure (normally atmospheric pressure, which is normal vent pressure). In actual practice, however, it has been discovered that the relationship between these pressures more closely follows the dash line b (in the absence of a back pressure regulator). In a standard atmospherically vented system, when the tank gage pressure is zero (i.e., the tank is empty) there is a small indicator pressure reading, indicated at c on the graph. This is often referred to as the "air on" pressure and this is undesirable to the extent that it indicates that there is liquid in the tank, whereas in fact there may not be. As the pressure builds up in the tank (e.g., on filling) curve b stays somewhat below theoretical curve a until a point d when it crosses a and then curves upwardly (shown exaggerated). Ideally, the second pressure regulator (i.e., the back pressure regulator) is set to make substantially constant the differential between these pressures at point d on the curve. This causes the indicator pressure to thereafter accurately track tank pressure as it increases. The air-on pressure c, which distorts indicated readings at pressures close to ambient or vent pressure, is particularly aggravated when stainless steel diaphragms are used in the sensor. It has been discovered that the air-on may be more than two or three times greater with stainless steel diaphragms than it is with elastomeric diaphragms.

The present invention overcomes this problem by reducing overall system pressure below atmospheric or normal vent pressure, such as to the point represented by the negatively displaced axes shown in phantom lines. Under these conditions the system performs exactly as before and therefore the same references to the graph are used except that they are primed. In the system of the present invention there is still an air-on signal when trying to sense pressures near venting pressure, but it is fully corrected by the back pressure regulator prior to reaching atmospheric pressure. Therefore the indicator accurately tracks the pressure in the tank in accordance with theoretical line a from zero gage pressure on upward. To get accurate readings from zero gage and upward, the eductor merely has to reduce system pressure by an amount equal to the value of e. Furthermore, if the eductor is designed to reduce system pressure to close to zero absolute, then the system will operate accurately to track tank pressure for a substantial range of vacuums below atmospheric. Thus a system incorporating the present invention is capable of not only handling vacuum tank installations, but also is one which is not susceptible to air-on signal errors at low liquid levels, even in those installations where a stainless steel diaphragm is used.

Figure 7:
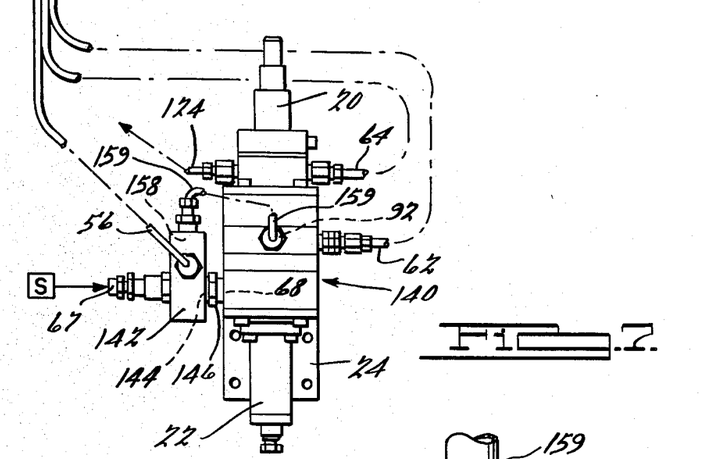
FIG. 7 is a side elevational view of a modified version of the sensor control of the present invention adapted for retrofit applications.
Figure 8:
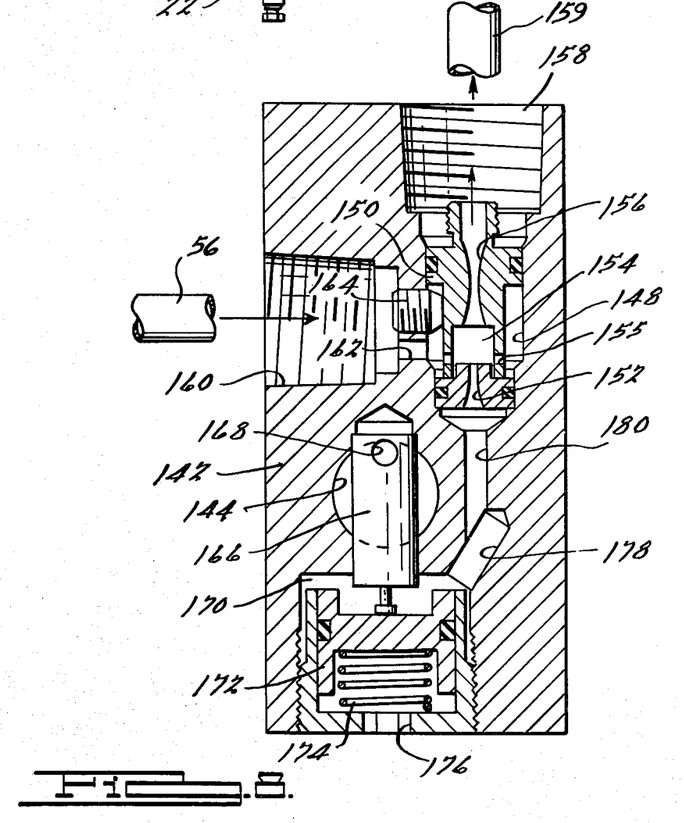
FIG. 8 is a vertical sectional view through a portion of the sensor control illustrated in FIG. 7.

In FIGS. 7 and 8 there is illustrated an alternative embodiment of the invention in which the eductor is retrofit to existing pressure sensing systems. Where parts are the same, the same reference numerals are used. In this embodiment the sensor control, indicated at 140, has no internal eductor; instead, there is provided a vent adapter or a second body 142 for providing a similar function. Vent adapter 142 connects between the compressed air supply and the sensor control, and between the sensor vent and the sensor control. To accomplish this it has an internal through passage 144 communicating at one end with a fitting 146 connected to supply port 68 in the sensor control and at the other end with a port (not shown) to which flexible tube 67 is connected for the supply of compressed air. The vent adapter contains a bore 148 in which there is disposed an eductor 150 including an inlet nozzle 152, a vacuum chamber 154 communicating with bore 148 via opening 155, and an outlet nozzle 156 communicating with a port 158. The latter port is connected via a flexible tube 159 to vent port 92 in the sensor control. The vent adapter has a vent inlet port 160 communicating via a passage 162 with openings 155. A set screw 164 may be utilized to retain the eductor in position.

Supply compressed air, in addition to passing directly into port 68 of the sensor control, passes from passage 144 through a pressure regulator comprising a conventional Shroeder-type valve 166 having an inlet 168, a regulator chamber 170 having a piston 172 therein and a spring 174 urging the piston against the valve actuator in a direction to open the valve. The spring side of the piston is vented at 176. Regulated compressed air which is passed through valve 166 into chamber 170 thereafter passes into passageway 180 and the inlet to the eductor via an intermediate passage 178. This pressure regulator is optional in that it is not essential to the operation of the apparatus, but is provided for the purpose of limiting the amount of air supplied to the eductor, for conservation reasons. In this embodiment the eductor functions to reduce the pressure in the vent line 56 from the sensor to the back pressure regulator, which serves to reduce overall system pressure sufficiently to provide the aforesaid advantages. Even though this retrofit arrangement of the second embodiment may not be as good as the first embodiment for measuring the pressure in vacuum tanks, this is not a problem because all retrofit systems are for liquid tanks which never go below atmospheric pressure. This is because prior systems were not capable of operation below atmospheric pressure.

Although the above system has been described using compressed air, it should be appreciated that any suitable inert gas may be used. It should also be understood that the system is not limited to the measuring and indicating of the weight, volume or depth of liquids in tanks, but is fully applicable to the measuring and indicating of any pressure which can be sensed by the sensor. Although the apparatus is disclosed utilizing an eductor of conventional construction for the purpose of creating the vacuum desired, it will be appreciated that other devices for generating a vacuum using compressed air may be used. Furthermore, in lieu of the diaphragm-type sensor other gas-type sensors may be used, such as those utilizing pistons or other pressure balancing mechanisms.

Thus there is disclosed in the above description and in the drawings an improved pressure sensing system which fully and effectively accomplishes the objectives thereof. However, it will be apparent that variations and modifications of the disclosed embodiments may be made without departing from the principles of the invention or the scope of the appended claims.

I claim:

1. In an apparatus for measuring the pressure of a fluid in a tank including sensor control means, comprising:
    a source of an indicator gas connected to the sensor control means under pressure;
    said sensor control means including indicator gas flow regulator means in fluid communication with said source;
    sensor means for sensing the pressure of the fluid being measured, including
        a deflectable diaphragm exposed on its outer side to the pressure of the fluid being measured and having an opposite inner indicator side,
        first passage means in fluid communication with said flow regulator means and said sensor means for supplying said indicator gas from said flow regulator means to said indicator side of said diaphragm,
        said indicator gas being supplied by said flow regulator means at a controlled flow rate and at a sufficiently high pressure to balance the pressure of the fluid being measured on said outer side of said diaphragm, and
        second passage means, in fluid communication with said sensor means and said flow regulator means, for venting said indicator gas from said indicator side of said diaphragm in response to the position of said diaphragm;
    the improvement comprising:
    pressure-reducing means operable in said sensor control means in response to a differential indicator gas pressure in the sensor control means of said apparatus for creating a vacuum zone in said apparatus; and third passage means in said apparatus for providing fluid communication between said vacuum zone and the indicator gas in said apparatus to reduce the overall pressure thereof.

2. The invention of claim 1, wherein said third passage means provides fluid communication between said vacuum zone and said vented indicator gas.

3. The invention of claim 1, further comprising pressure regulator means for maintaining a substantially constant pressure differential between said supplied indicator gas and said vented indicator gas, said third passage means providing fluid communication between said vacuum zone and said vented indicator gas downstream of said pressure regulator means.

4. The invention of claim 1, further comprising pressure regulator means for maintaining a substantially constant pressure differential between said supplied indicator gas and said vented indicator gas, said third passage means providing fluid communication between said vacuum zone and said vented indicator gas upstream of said pressure regulator means.

5. The invention of claim 1, wherein said diaphragm is fabricated from stainless steel.

6. The invention of claim 1, wherein said diaphragm is fabricated from an elastomeric composition.

7. A sensor control means for an apparatus for measuring the pressure of a fluid in a tank utilizing a sensor having a deflectable diaphragm exposed on its outer side to the fluid being measured and having an opposite inner indicator side, said sensor control means comprising:
 a body;
 an indicator gas flow regulator in said body in fluid communication with a source of an indicator gas under pressure, said flow regulator being adapted to control the flow rate of said indicator gas therethrough;
 an outlet port in said body in fluid communication with said flow regulator and said sensor for supplying said indicator gas from said flow regulator to said indicator side of said diaphragm of said sensor;
 first flow passage means for venting said indicator gas from said indicator side of said diaphragm of said sensor;
 an inlet port in said body in fluid communication with said first flow passage means for receiving said vented indicator gas from said indicator side of said diaphragm of said sensor in response to the position of said diaphragm;
 an eductor in said body operable in response to differential gas pressures in said body for creating a vacuum zone therein; and
 second flow passage means located in said body for providing fluid communication between said vacuum zone and the vented indicator gas in said sensor control means to reduce the overall pressure thereof.

8. A sensor control means for an apparatus for measuring the pressure of a fluid in a tank utilizing a sensor having a deflectable diaphragm exposed on its outer side to the fluid being measured and having an opposite inner indicator side, said sensor control means comprising:
 a body;
 an indicator gas flow regulator in said body in fluid communication with a source of an indicator gas under pressure, said flow regulator being adapted to control the flow rate of said indicator gas therethrough;
 an outlet port in said body in fluid communication with said flow regulator and said sensor for supplying said indicator gas from said flow regulator to said indicator side of said diaphragm of said sensor;
 first flow passage means for venting said indicator gas from said indicator side of said diaphragm of said sensor;
 an inlet port in said body in fluid communication with said first flow passage means for receiving said vented indicator gas from said indicator side of said diaphragm of said sensor in response to the position of said diaphragm;
 an eductor in said body operable in response to differential gas pressures in said body for creating a vacuum zone therein; and
 second flow passage means located in said body for providing fluid communication between said vacuum zone and the vented indicator gas in said sensor control means to reduce the overall pressure thereof;
 said sensor control means further comprising pressure regulator means in said body for maintaining a substantially constant pressure differential between said supplied indicator gas and said vented indicator gas, said second flow passage means providing fluid communication between said vacuum zone and said vented indicator gas downstream of said pressure regulator means.

9. A sensor control means for an apparatus for measuring the pressure of a fluid in a tank utilizing a sensor having a deflectable diaphragm exposed on its outer side to the fluid being measured and having an opposite inner indicator side, said sensor control means comprising:
 a body;
 an indicator gas flow regulator in said body in fluid communication with a source of an indicator gas under pressure, said flow regulator being adapted to control the flow rate of said indicator gas therethrough;
 an outlet port in said body in fluid communication with said flow regulator and said sensor for supplying said indicator gas from said flow regulator to said indicator side of said diaphragm of said sensor;
 first flow passage means for venting said indicator gas from said indicator side of said diaphragm of said sensor;
 an inlet port in said body in fluid communication with said first flow passage means for receiving said vented indicator from said indicator side of said diaphragm of said sensor in response to the position of said diaphragm;
 an eductor in said body operable in response to differential gas pressures in said body for creating a vacuum zone therein; and
 second flow passage means located in said body for providing fluid communication between said vacuum zone and the vented indicator gas in said sensor control means to reduce the overall pressure thereof;
 said sensor control means further comprising pressure regulator means in said body for maintaining a substantially constant pressure differential between said supplied indicator gas and said vented indicator gas, said flow passage means providing fluid communication between said vacuum zone and said vented indicator gas upstream of said pressure regulator means.

10. A sensor control means for an apparatus for measuring the pressure of a fluid in a tank utilizing a sensor having a deflectable diaphragm exposed on its outer side to the fluid being measured and having an opposite inner indicator side, said sensor control means comprising:
 a first body;
 a first indicator gas flow regulator in said first body in fluid communication with an indicator gas inlet port, said flow regulator being adapted to control the flow rate of an indicator gas therethrough, said first indicator gas inlet port being in fluid communication with a source of said indicator gas under pressure;

an indicator gas outlet port in said first body in fluid communication with said flow regulator and said sensor for supplying said indicator gas from flow regulator to said indicator side of said diaphragm of said sensor;

flow passage means for venting said indicator gas from said indicator side of said diaphragm of said sensor;

a second indicator gas inlet port in said first body for receiving said indicator gas vented from said indicator side of said diaphragm of said sensor in response to the position of said diaphragm;

a second body;

an eductor in said second body disposed in fluid communication between said source of said indicator gas under pressure and said second indicator gas inlet port and operable to create a vacuum zone in said second body; and means in said second body for providing fluid communication between said vacuum zone and said vented indicator gas in said sensor to reduce the overall pressure in said fluid pressure measuring apparatus.

11. In an apparatus for measuring the pressure of a liquid fluid in a tank comprising a pressure indicator gas-type sensor to measure fluid pressure, a source of an indicator gas, a sensor control means in fluid communication with said source and said sensor for supplying said indicator gas from said source at a controlled indicator gas flow rate to said sensor and for venting said indicator gas from said sensor, the improvement comprising:

pressure-reducing means in said sensor control means operable in response to a differential indicator gas pressure in said sensor control means for creating a vacuum zone therein having an indicator gas pressure less than any other indicator gas pressure in the apparatus; and passage means for providing fluid communication between said vacuum zone and the vented indicator gas in said apparatus in ordr to reduce the overall pressure of said indicator gas in said apparatus.

12. The invention of claim 11, wherein said passage means provides fluid communication between said vacuum zone and said vented indicator gas from said sensor.

13. The invention of claim 11, further comprising a pressure regulator means for maintaining a substantially constant indicator gas pressure differential between said supplied indicator gas and said vented indicator gas.

14. The invention of claim 13, wherein said vacuum zone is in fluid communication with said vented indicator gas from said sensor upstream of said pressure regulator means.

15. The invention of claim 11, wherein said pressure-reducing means reduces said overall pressure of said apparatus by an amount at least equal to the pressure of said supplied indicator gas at the time the ratio of the supplied indicator gas pressure to the indicator gas pressure sensed by said sensor first reaches its theoretical value.

16. The invention of claim 11, wherein said pressure-reducing means is an eductor.

17. The invention of claim 11, wherein said sensor control means and said pressure-reducing means are disposed in the same housing.

18. The invention of claim 11, wherein said sensor control means and said pressure-reducing means are disposed in separate housings, whereby the latter may be connected to the former subsequent to installation of the overall apparatus.

19. The invention of claim 18, wherein said sensor control means normally has a source of compressed indicator gas connected thereto, said pressure-reducing means being adapted to be connected between said source of compressed indicator gas and said sensor control means.

20. In an apparatus for measuring the pressure of a fluid in a tank comprising a pressure indicator gas-type sensor, a source of an indicator gas, a sensor control means in fluid communication with said source and said sensor for supplying said indicator gas from said source at a controlled indicator gas flow rate to said sensor and for venting said indicator gas from said sensor, the improvement comprising:

pressure-reducing means in said sensor control means operable in response to a differential indicator gas pressure in said sensor control means for creating a vacuum zone therein having an indicator gas pressure less than any other indicator gas pressure in the apparatus;

passage means for providing fluid communication between said vacuum zone and the vented indicator gas in said apparatus in order to reduce the overall pressure of said indicator gas in said apparatus;

said sensor control means and said pressure-reducing means being disposed in separate housings, whereby the latter may be connected to the former subsequent to installation of the overall apparatus, said sensor control means normally having a source of compressed indicator gas connected thereto, said pressure-reducing means being adapted to be connected between said source of compressed indicator gas and said sensor control means, said sensor control means being normally in a direct fluid communication with said vented indicator gas from said sensor, said pressure-reducing means being adapted to be connected in the path of vented indicator gas between said sensor and said sensor control means.

21. In an apparatus for measuring and indicating the weight, volume, pressure or depth of a liquid in a tank, comprising:

a sensor control means;

a source of an indicator gas connected to said sensor control means under pressure;

an indicator gas flow regulator in fluid communication with said source;

a fluid pressure sensor for sensing the pressure of said liquid, including sealed housing means having a deflectable diaphragm exposed on its outer side to the liquid in said tank and having an opposite inner indicator side, passage means in fluid communication with said flow regulator and said sensor for supplying said indicator gas from said flow regulator to said indicator side of said diaphragm;

said indicator gas being supplied by said flow regulator at a controlled flow rate and at a sufficiently high indicator gas pressure to balance the liquid pressure on said outer side of said diaphragm, and a nozzle in fluid communication with said sensor and said flow regulator and in close proximity to said indicator side of said diaphragm for venting said indicator gas therefrom in response to the position of said diaphragm;

a pressure regulator in said sensor control means in fluid communication with said nozzle for maintaining a substantially fixed indicator gas pressure differential between said vented indicator gas and said supplied indicator gas; and a fluid pressure indicator device in fluid communication with and responsive to the pressure of said supplied indicator gas in order to indicate the pressure of said indicator gas in terms of the pressure of said liquid on said outer side of said diaphragm and thereby indicate the weight, volume or depth of the liquid in said tank;

the improvement comprising:

an eductor in fluid communication with said source of indicator gas under pressure for creating a vacuum zone in said eductor; and means in said apparatus for providing fluid communication between said vacuum zone in said eductor and the indicator gas in said apparatus in order to reduce the overall indicator gas pressure thereof.

22. In an apparatus for measuring the pressure of a fluid in a tank comprising a pressure indicator gas-type sensor, a source of an indicator gas, a sensor control means in fluid communication with said source and said sensor for supplying said indicator gas from said source at a controlled indicator gas flow rate to said sensor and for venting said indicator gas from said sensor, the improvement comprising:

pressure-reducing means in said sensor control means operable in response to a differential indicator gas pressure in said sensor control means for creating a vacuum zone therein having an indicator gas pressure less than any other indicator gas pressure in the apparatus;

passage means for providing fluid communication between said vacuum zone and the vented indicator gas in said apparatus in order to reduce the overall pressure of said indicator gas in said apparatus;

pressure regulator means for maintaining a substantially constant indicator gas pressure differential between said supplied indicator gas and said vented indicator gas, said vacuum zone being in fluid communication with said vented indicator gas from said sensor downstream of said pressure regulator means.

23. In an apparatus for measuring the pressure of a fluid in a tank comprising a pressure indicator gas-type sensor, a source of an indicator gas, a sensor control means in fluid communication with said source and said sensor for supplying said indicator gas from said source at a controlled indicator gas flow rate to said sensor and for venting said indicator gas from said sensor, the improvement comprising:

pressure-reducing means in said sensor control means operable in response to a differential indicator gas pressure in said sensor control means for creating a vacuum zone therein having an indicator gas pressure less than any other indicator gas pressure in the apparatus;

passage means for providing fluid communication between said vacuum zone and the vented indicator gas in said apparatus in order to reduce the overall pressure of said indicator gas in said apparatus;

pressure regulator means for maintaining a substantially constant indicator gas pressure differential between said supplied indicator gas and said vented indicator gas, said pressure-reducing means reducing said overall pressure of said indicator gas in said apparatus by an amount at least equal to pressure of said supplied indicator gas at the time the ratio of supplied indicator gas pressure to the indicator gas pressure sensed by said sensor first reaches its theoretical value.

* * * * *

UNITED STATES PATENT AND TRADEMARK OFFICE
CERTIFICATE OF CORRECTION

PATENT NO. : 4,454,760

DATED : June 19, 1984

INVENTOR(S) : George W. Carlisle

It is certified that error appears in the above-identified patent and that said Letters Patent is hereby corrected as shown below:

On the title page under references cited: 3,590,850 Grise "2/71" should be -- 7/71 --.

Column 1, line 29, "passage" should be -- pressure --.

Column 4, line 24, "liquid fluid or" should be -- fluid or liquid --.

Column 6, lines 55 and 56, Claim 1, "operable in said sensor control means" should be -- in said sensor control means operable --.

Column 9, line 8, Claim 10, after "from" insert -- said --.

UNITED STATES PATENT AND TRADEMARK OFFICE
CERTIFICATE OF CORRECTION

PATENT NO. : 4,454,760

DATED : June 19, 1984

INVENTOR(S) : George W. Carlisle

It is certified that error appears in the above-identified patent and that said Letters Patent is hereby corrected as shown below:

Column 9, line 46, Claim 11, "ordr" should be -- order --.

Column 11, line 9, Claim 21, after "means" insert -- and --.

Signed and Sealed this

Fifteenth Day of January 1985

[SEAL]

Attest:

GERALD J. MOSSINGHOFF

Attesting Officer

Commissioner of Patents and Trademarks